United States Patent [19]

Kimura

[11] Patent Number: 5,270,917
[45] Date of Patent: Dec. 14, 1993

[54] PLANT MONITORING AND CONTROL SYSTEM

[75] Inventor: Yoshiyuki Kimura, Yokohama, Japan

[73] Assignee: Kabushiki Kaisha Toshiba, Kawasaki, Japan

[21] Appl. No.: 747,671

[22] Filed: Aug. 20, 1991

[30] Foreign Application Priority Data

Aug. 21, 1990 [JP] Japan .................... 2-218069

[51] Int. Cl.$^5$ .................. G06F 15/46; G06F 11/16; G05B 9/03
[52] U.S. Cl. ..................... 364/187; 371/9.1
[58] Field of Search ............. 364/184–187, 364/131–136, 492, 494; 371/9.1, 68, 68.1, 68.2, 68.3

[56] References Cited

U.S. PATENT DOCUMENTS

| | | | |
|---|---|---|---|
| 4,500,951 | 2/1985 | Sugimoto et al. | 364/18 C |
| 4,542,479 | 9/1985 | Kamimura et al. | 364/184 |
| 4,667,284 | 5/1987 | Asami | 364/187 |
| 4,707,778 | 11/1987 | Yamada et al. | 364/187 X |
| 4,998,194 | 3/1991 | Okamoto et al. | 364/187 X |
| 5,021,938 | 6/1991 | Hayakawa | 364/187 X |

FOREIGN PATENT DOCUMENTS

3214328 12/1982 Fed. Rep. of Germany .

OTHER PUBLICATIONS

ABB Review, No. 8/9, 1989, pp. 31–36, J. Bodin, "Enhanced Availability for Process Control Systems".
Advances In Instrumentation and Control, vol. 44, No. 1, 1989, pp. 141–152, S. Morgan, et al., "Reliable Control System for LNG Gasification Plant".
"New Integrated Control System with MAP-Based LAN", Toshiba Review, No. 44–6, Keisuke Takada et al, 1989, pp. 456–458.
"Networking for CIEMAC", Toshiba Review, No. 44–6, Koichi Kishimoto et al. 1989, pp. 459–461.

Primary Examiner—Joseph Ruggiero
Attorney, Agent, or Firm—Oblon, Spivak, McClelland, Maier & Neustadt

[57] ABSTRACT

A plant monitoring and control system is specialized in a plant such as a reactor power plant, which is provided with plural process systems functionally divided, and is communicable between the process systems with broadcast communication. Detection signals corresponding to process variables of the process systems, detected by the detectors, are supplied into the transmission line by the remote process input-output unit. Command signals can be also supplied into the line via an input unit and a console controller of a corresponding operator console. A corresponding process controller takes in the detection signals and command signals from the line, and returns calculated control signals into the line. The remote process input-output unit, controls, the corresponding process device by outputting the control signals to the process device. Each of the process controllers incorporates a control backup element against control failure of other process controllers, and eliminating the need for a multiplex construction of the process controller for a redundant system. The console controller controls images on a display unit in the corresponding operator console. A display backup element can also be incorporated in the console controllers respectively, in order to simplify the console construction.

38 Claims, 9 Drawing Sheets

PLANT MONITORING AND CONTROL SYSTEM

BACKGROUND OF THE INVENTION

The present invention relates to a plant monitoring and control system for operation and control of an industrial plant such as a power plant, a chemical plant or the like, and is particularly concerned with a plant monitoring and control system provided with backup means against failure of incorporated controllers.

A bigger plant, such as a power plant, usually has plural control systems divided according to control functions. The plural control systems compose a function-divided control system to disperse risks of a process system shutdown caused by the control system failure.

The function-divided control system has used extensively of late a digital control system according to a progress in semiconductor technique and communication technique. The digital control system is, for example, provided with a remote process input-output unit, a digital process controller, and an operator console at every control system. The operator console is provided with a digital console controller, input units such as key boards, and display units such as CRT's (cathode-ray tube). In addition, all of the remote process input-output units, the process controllers, and the console controllers throughout control systems are connected by a transmission line. The digital-type controllers including the remote process input-output units are designed to be able to perform broadcast communication through the transmission line using a time sharing technique.

That is, plant process variables (e.g. temperature, flow-rate, valve status and so on) are detected by detectors, and detection signals corresponding to the process variables are transmitted into the transmission line for the other controllers by the remote process input-output unit. A process controller takes in, at every assigned time, detection signals and command signals of an operator which are transmitted through the line, and calculates control signals according to a given arithmetic operation procedure. The calculated control signals are then transmitted into the transmission line for the other controllers at every assigned time by the process controller. A remote process input-output unit takes in the control signals at every assigned time and outputs the control signals to process devices to control the process system.

On the other hand, a console controller takes in, at every assigned time, signals corresponding to process status and the operator's command signals, and calculates display signals in accordance with a given procedure. The calculated display signals are visualized on the screen of the display units for the operator to monitor the plant process state. The console controller also acts as an interface unit between the input units and the transmission line.

Moreover, in utilizing the above digital control system, a multiplex construction as a redundant system is essential for enhancing a reliability of monitoring and control of the process which is important for the plant operation. To accomplish the multiplex construction, the plural process controllers, the functions of which are the same for mutual backups, are provided for each control system, and also the plural console controllers of an operator console, the functions of which are the same for mutual backups, are provided for each control system.

However, in the above-described plant monitoring and control system, redundant systems installed for securing a high reliability become complicated in construction and increase system size.

SUMMARY OF THE INVENTION

Accordingly, it is a primary object of the present invention to provide a plant monitoring and control system whose redundant systems can be simplified with a high reliability for the control of a plant process.

It is another object of the present invention to provide a plant monitoring and control system, in which the redundant systems for at least one of the process controller and the console controller can be simplified in construction.

It is further object of the present invention to provide a plant monitoring and control system which is able to avoid excessive arithmetic operation task for a certain process controller when accomplishing the simplification of the redundant systems.

It is a still further object of the present invention to provide a plant monitoring and control system applicable to a reactor power plant, especially, without the increased capacity of an incorporated memory for storing predetermined data in the controllers.

It is a still further object of the present invention to provide a plant monitoring and control system, in which operators can designate backed-up console controllers at their will.

These and other objects can be achieved according to the present invention, in one aspect by providing, a plant monitoring and control system comprising a plurality of detectors for detecting process variables of plural process systems which are functionally divided in a plant; a plurality of process devices for controlling the process systems by control signals; a transmission line for transmitting signals for broadcast communication; a plurality of elements for supplying detection signals from the plural detectors into the transmission line at every assigned time; a plurality of input units, usable by operators, provided corresponding to each process system; a plurality of elements for supplying command signals from the plural input units into the transmission line at every assigned time; a plurality of elements for controlling the process, which take in the detection signals and command signals corresponding to the process systems from the transmission line at every assigned time, calculate the control signals by operation in accordance with assigned control functions for the process systems, and supply the control signals into the transmission line at every assigned time; a plurality of elements for driving the process devices, which take in the control signals corresponding to the process systems from the transmission line at every assigned time, and supply the control signals to the process devices respectively; and a control backup element for backing up the process control elements, in case some of the process control elements get faulty.

In another aspect according to the present invention, there is also provided a plant monitoring and control system comprising, instead of the aforementioned control backup element, a plurality of elements for controlling displays, which take in, corresponding to the process systems, the detection signals and the control signals from the transmission line as well as the command signals from the input unit at every assigned time, and form display signals by operation in accordance with the assigned display function for the process systems; a plurality of display units for displaying each image based on the display signals from the display control element; and a display backup element for backing up the display control elements, in case some of the display control elements get faulty.

In a further aspect according to the present invention, there is also provided a plant monitoring and control system comprising, the aforementioned control backup element and display backup element together.

Preferably, the control backup element is composed of plural elements corresponding to the plural process control elements respectively. It is also preferred that the process control element and the control backup element are incorporated in a single process controller, and both of the process control element and the control backup element operate using time sharing in the process controller. The single control backup element is preferably provided with a backup order table in which a backup order for other process systems is included, an arithmetic operation procedure table in accordance with control functions which are assigned to the process systems to be backed up, and an element for calculating the control signals on the basis of data from the backup order table and the arithmetic operation procedure table.

Preferably, the display backup element is composed of plural elements corresponding to the plural display control elements respectively. It is also preferred that the display control element and the display backup element are incorporated in a single controller, and both of the display control element and the display backup element operate using time sharing in the controller. Preferably, the controller, the input unit, and the display unit are incorporated in an operator console for each process system.

In the aforementioned systems, at least one of a certain process control element and display control element fails in its predetermined operation, including power breakdown, a predetermined control backup element (or display backup element) will perform the operation of the failed controller instead, according to a predetermined backup order. As a result, multiplex constructions as redundant systems for the process control elements (or display control elements) can be avoided, leading to simplification of the redundant systems with keeping a high reliability of controls.

It is also preferred that the plural control backup elements exchange information representing task amounts in the corresponding self process control elements update and memorize an order of less task at a certain time interval on the basis of the interchanged information, and back up the faulty process control elements according to the updated order.

As a result, over-load of arithmetic operation for a certain control backup element can be avoided.

It is also preferred that the plant is a reactor power plant. Further, the plural process control elements and the plural control backup elements are each grouped according to differences in attribute of the control function assigned to the process control elements, and each of the control backup elements acts as a substitute for the faulty process control element in the group only.

The aforementioned systems will be especially specialized in a bigger plant such as a reactor power plant, and lead to the reduced capacity of incorporated memories of the process control elements.

It is also preferred that the input unit is provided with a keyed switch having operator-changed ON and OFF positions and supplying signals corresponding to the switching positions, and the display backup element takes in the signal from the keyed switch, judges the switching position of the keyed switch, and backs up the display control element, in case only when the switching position is ON position. Further, the input unit is capable of taking in passwords from operators, and the display backup element takes the passwords in, and backs up other display control element, in case only, when the passwords coincide with a predetermined password.

As a result, by using the keyed switch or passwords, operators can designate display backup elements at their will.

BRIEF DESCRIPTION OF THE DRAWINGS

The accompanying drawings which are incorporated in and constitute a part of this specification, illustrate embodiments of the invention and, together with the description, serve to explain the principles of the invention; in which.

DESCRIPTION OF THE PREFERRED EMBODIMENTS

A first embodiment of the present invention wil now be described with reference to FIG. 1 to 4.

Figure 1:
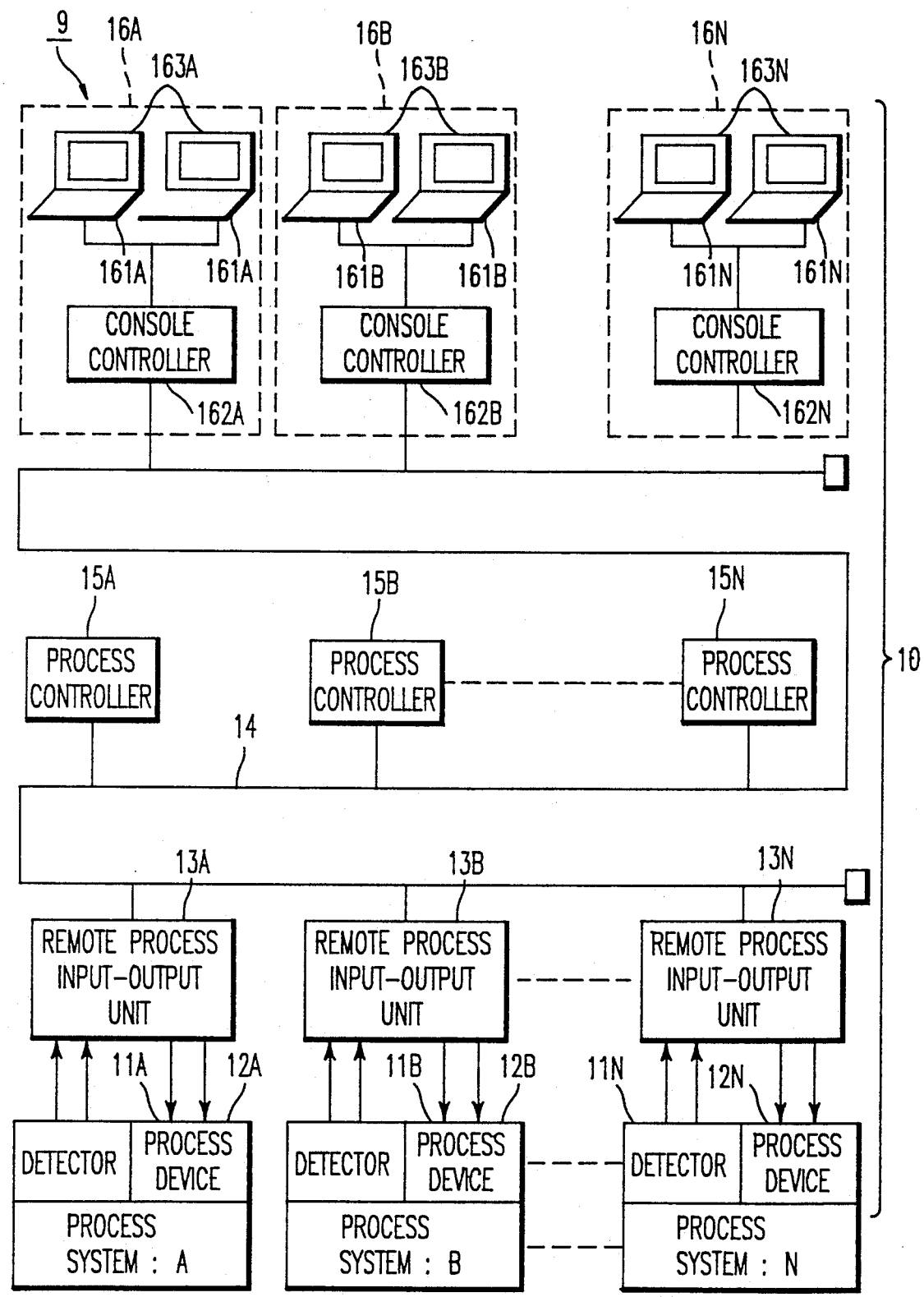
FIG. 1 is a schematic block diagram of a plant monitoring and control system according to a first preferred embodiment of the present invention.

FIG. 1 depicts a schematic block diagram of a plant 9 such as a reactor power plant. The plant 9 is provided with a plurality of process systems A, B ... N which are divided according to control systems, and a plant monitoring and control system 10 for individually operating and controlling the process systems A to N.

A plant monitoring and control system 10 shown in FIG. 1 comprises a plurality of detectors 11A, 11B ... 11N for detecting process variables of the process systems A, B ... N respectively, a plurality of process devices 12, 12B ... 12N for operating and controlling the process systems A, B ... N respectively, and a plurality of remote process input-output units 13A, 13B ... 13N connected to the detectors 11A to 11N and the process devices 12A to 12N, a transmission line 14 connected to the remote process input-output units 13A to 13N, a plurality of process controllers 15A, 15B ... 15N connected to the transmission line 14, and a plurality of operator consoles 16A, 16B ... 16N also connected to the transmission line 14.

The detectors 11A to 11N are able to detect assigned process variables such as circulating water flow-rate or circulating water temperature, and generate electric signals corresponding to the process variables, respectively. Each of the process devices 12A to 12N acts as an actuator, such as a control valve, thus individually being able to adjust the assigned process variables of the process system A (to N) to a desired value in response to control signals from the remote process input-output unit 13A (to 13N).

The remote process input-output units 13A to 13N are provided for each process system A (to N), and disposed locally so as to adjust a cable length between the units and the detectors 11A to 11N and the process devices 12A to 12N as short as possible.

Each of the remote process input-output units 13A to 13N includes at least A/D (analog to digital) converters, D/A (digital to analog) converters, amplifiers, on-off status converters and a CPU (central processing unit), and functions as an interface unit between the transmission line 14 and the detectors 11A (to 11N) and the process devices 12A (to 12N). Consequently, the analog detection signals supplied into the remote process input-output unit 13A (to 13N) by the detector 11A (to 11N) can be converted into digital signals and can be transmitted into the transmission line 14 at every assigned time with the time shared control. On the other hand, digital control signals transmitted from the process controller 15A (to 15N) through the transmission line 14 can be taken in by the designated remote process input-output unit 13A (to 13N) at every assigned time with the time shared control, then converted into analog signals and amplified therein so as to generate driving signals (i.e., control signals) for the process device 12A (to 12N).

The transmission line 14 is capable of transmitting digital electric signals for broadcast communication thereby.

As described above, the combination of the remote process input-output units 13A to 13N and the transmission line 14 enables broadcast communication among them.

The process controllers 15A to 15N and the operator consoles 16A to 16N are provided correspondingly one to one to each of the process systems A to N of the plant 9.

Figure 2:
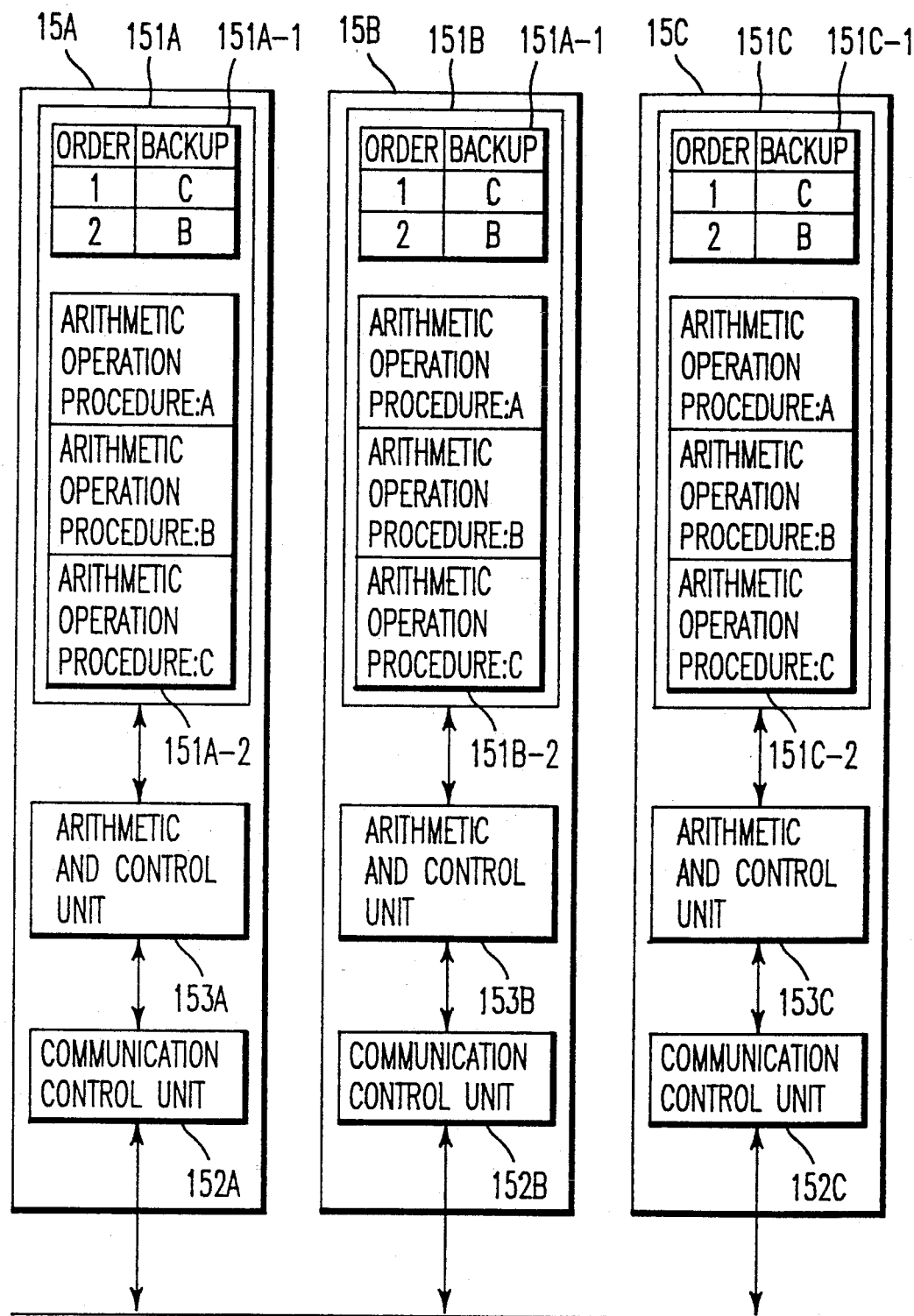
FIG. 2 is a schematic block diagram of process controllers in the first embodiment.

Each of the process controllers 15A to 15N is composed as shown in FIG. 2 (in this figure, only three controllers 15A to 15C are shown), namely, incorporates therein a data memory 151A (to 151N), a communication control unit 152A (to 152N), and an arithmetic and control unit 153A (to 153N) respectively. Each data memory 151A (to 151N) stores, as look-up tables, a backup order table 115A-1 (to 151N-1) in which a backup order can be set, and an arithmetic operation procedure table 151A-2 (to 151N-2) corresponding to functions of the plant process systems A (to N). In this case, each backup order table 151A-1 to 151N-1 can store two orders having the first and second backups. For example, for the table 151A-1, the first order is designated for the process system C and the second order is designated for the process system B. The backup orders of other tables 151B-1 to 151N-1 are formed on the same principle. The arithmetic operation procedure tables 151A-2 to 151N-2 store each procedure for all the process systems A to N respectively.

The communication control unit 152A (to 152N) is provided with a CPU, and is capable of communicating data between the arithmetic and control unit 153A (to 153N) and the transmission line 14 at every assigned time with time shared control. As a result, it is possible for the process controllers 15A to 15N to perform broadcast communication through the transmission line 14. Further, the arithmetic and control unit 153A (to 153N) is also provided with a CPU, and is designed to perform processes shown in FIG. 3A to 3C, so that control signals calculated therein can be given to the transmission line 14 via the communication control unit 152A (to 152N).

Figure 3A:
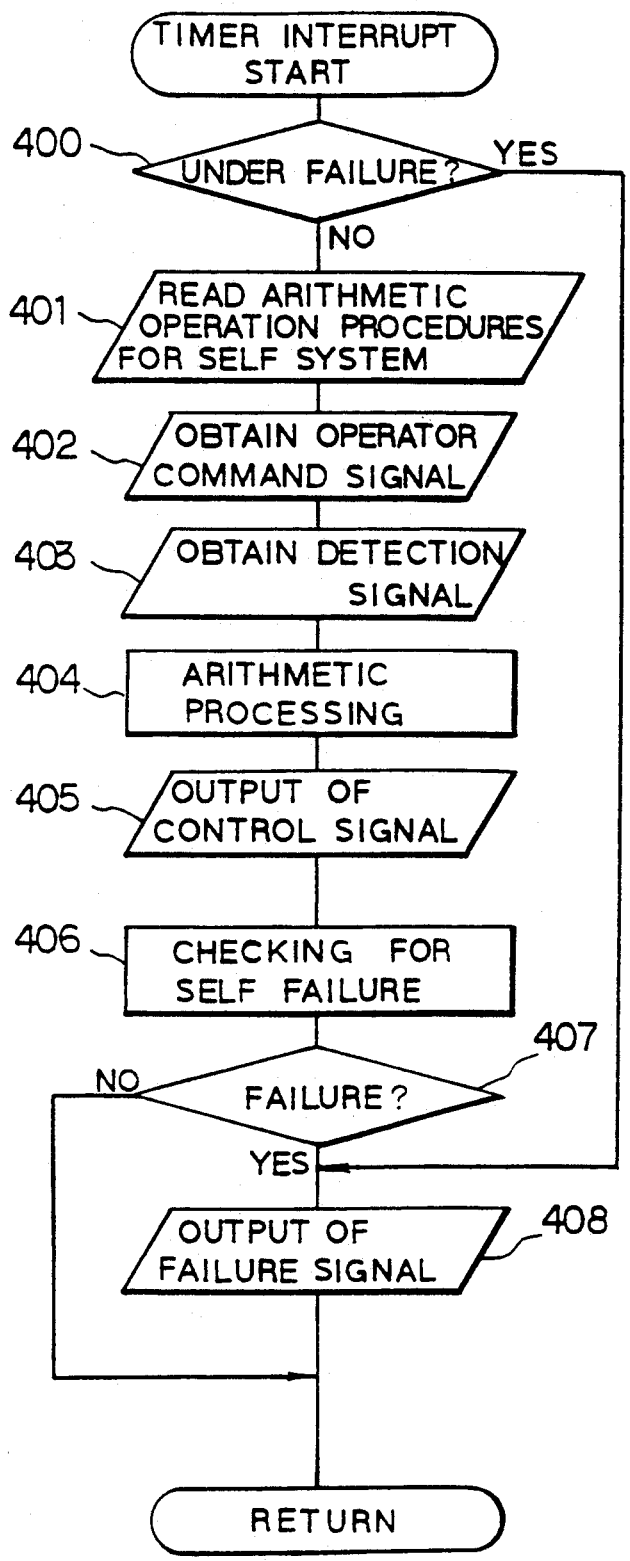
FIG. 3A is a flowchart representing self process control by the process controller.

Referring to the flowcharts in FIG. 3A to 3C, the operation of the arithmetic and control units 153A to 153N will now be explained. The processes in FIG. 3A to 3C ar to be performed at every fixed interval with timer interrupt method. In this explanation, for convenience' sake, only three units 153A to 153C will be referred to as shown in FIG. 2.

In the first Step 400, the arithmetic and control unit 153A (to 153C) judges whether the unit 153A (to 153C) itself is under self-failure or not. This judgment can be performed with a flag in a memory incorporated therein. If judged NO (normal) in this Step 400, then the unit 153A (to 153C) will proceed to Steps 401 to 407.

In the Step 401, corresponding arithmetic operation procedure for the self process system A (to C) is read from the arithmetic operation procedures table 151A-2 (to 151C-2). This reading step is performed only when the system starts up and is skipped at the next cycle. In Step 402, a command of an operator transmitted through the line 14 is taken in, and in Step 403, detection signals are also taken in. Then, in Step 404, arithmetic processing according to the procedure taken in Step 401 will be performed. As a result, the processing of Step 404 yields control signals for process variables in the self process system A (to C). The control signals, in Step 405, are then supplied into the transmission line 14 by the communication control unit 152A (to 152C).

Further, in Step 406, the arithmetic and control unit 153A (to 153C) will try to check the operating conditions of the self controller 15A (to 15C). The operating conditions are set to be, for example, internal state of a memory and deviation of a clock frequency of a timer. Then in Step 407, based on the data checked above, it is judged that the process controllers 15A (to 15C) is in a failed state or not. If judged NO (not failure) in Step 407, the following Step 408 is skipped.

On the other hand, if judged YES (failure) in Steps 407, the processing of Step 408 will consecutively be followed. In Step 408, the arithmetic and control unit 153A (to 153C) itself will output a failure signal to the other controllers by broadcast communication, via the communication control unit 152A (to 152C), showing that the process controller 15A (to 15C) for the process system A (to C) has failed and will abandon its process control from the coming assigned time. Consequently, all the other controllers including the remote process input-output units can determine the failure of the process controller 15A (to 15C) and exclude it from the control system composition.

Figure 3B:
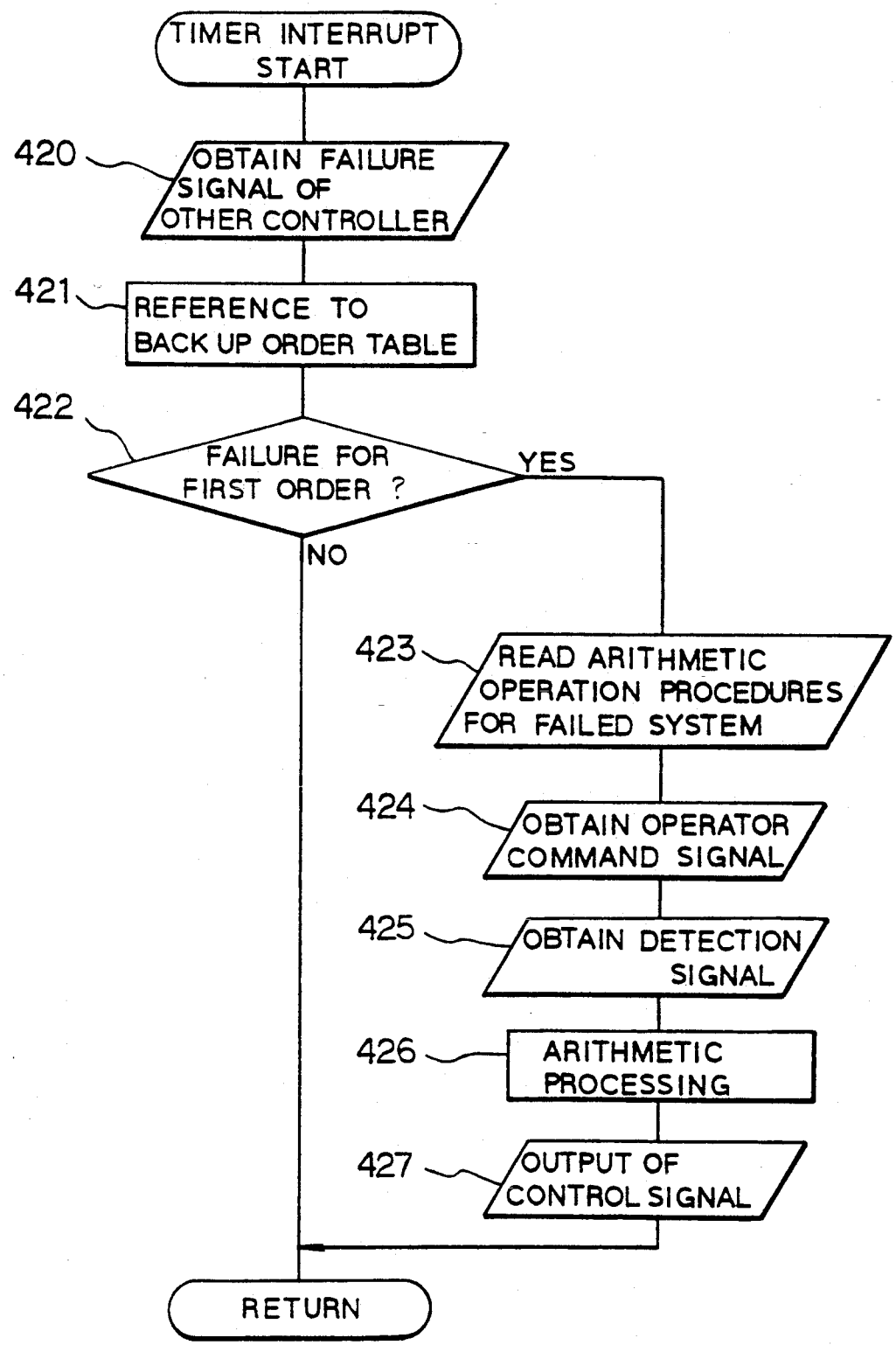
FIG. 3B and 3C are flowcharts representing backup control by the process controller.
Figure 3C:
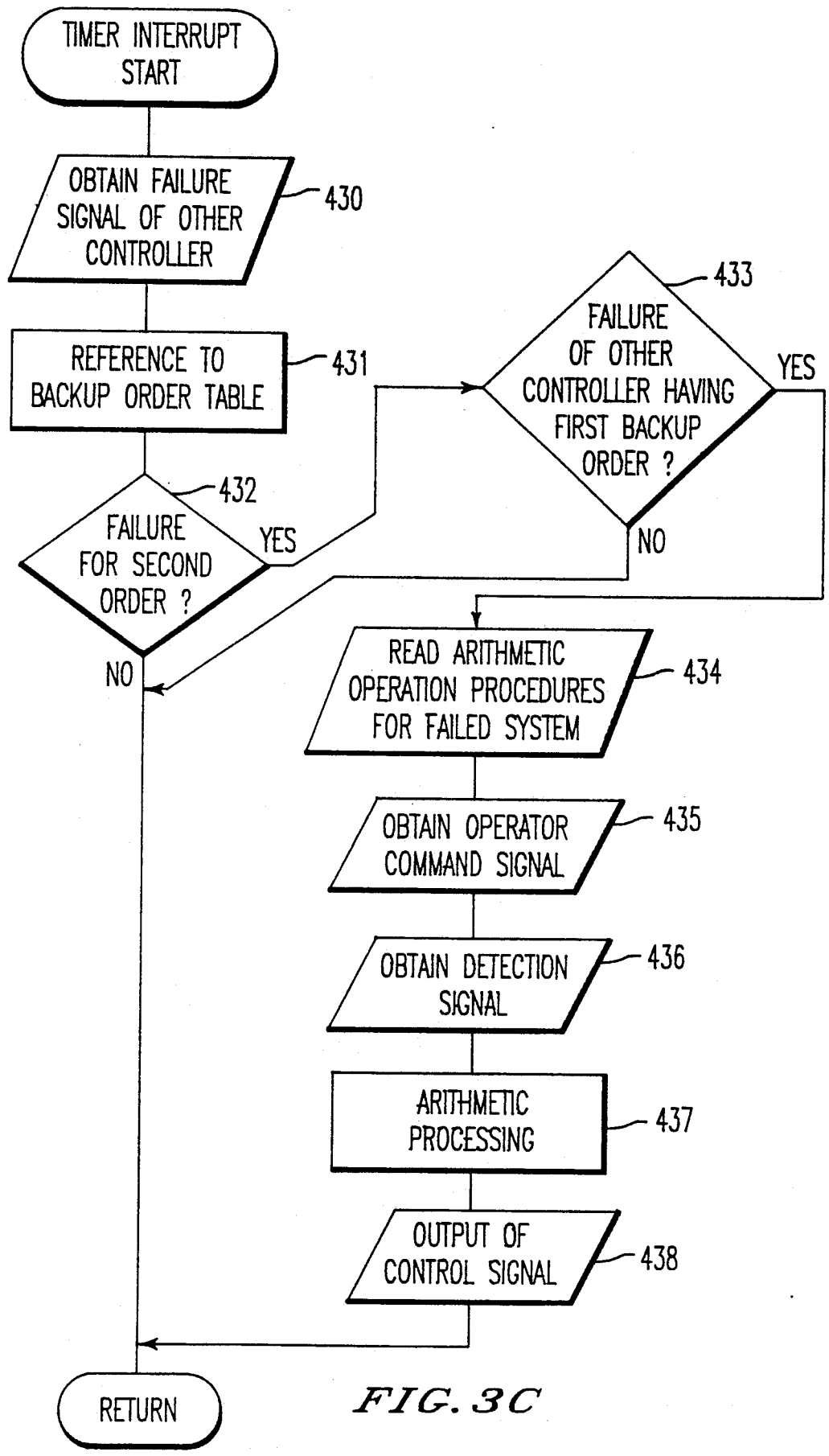

On the other hand, the arithmetic and control unit 153A (to 153C) will each perform the processes shown in FIG. 3B and 3C in the form of the timer interruption.

In the first Step 420 of FIG. 3B, the arithmetic and control unit 153A (to 153C) takes in the failure signals which might be generated in other control unit 153A (to 153C). In the next step 421, the taken-in signals are referred to the backup order table 151A-1 (to 151C-1).

Then, in Step 422, based on the result of the above reference, it is judged that the failure in other control unit 153A (to 153C), corresponding to the first backup order, occurred or not.

If judged NO (not failure) in Step 422, the process will be returned to the main program. But, when judged YES (failure) in Step 422, the process of Step 423 to 427 will be then followed. In step 423, corresponding arithmetic operation procedure for the failed control system is read from the arithmetic operation procedure table 151A-2 (to 151C-2). Then, in Step 424 to 427, the same processes as Step 402 to 405 are performed.

At another fixed timing, the processes shown in FIG. 3C, which are almost identical with the ones in FIG. 3B, carried out by the arithmetic and control unit 153A (to 153C). That is, after processing of Steps 430 and 431, the unit 153A (to 153C) judges whether both of the control system in the second backup order and the control system having the first backup order have failed or not in Steps 432 and 433. Then, the same processes as the above-described Steps 423 to 427 will be followed in Step 434 to 438.

Figure 3D:
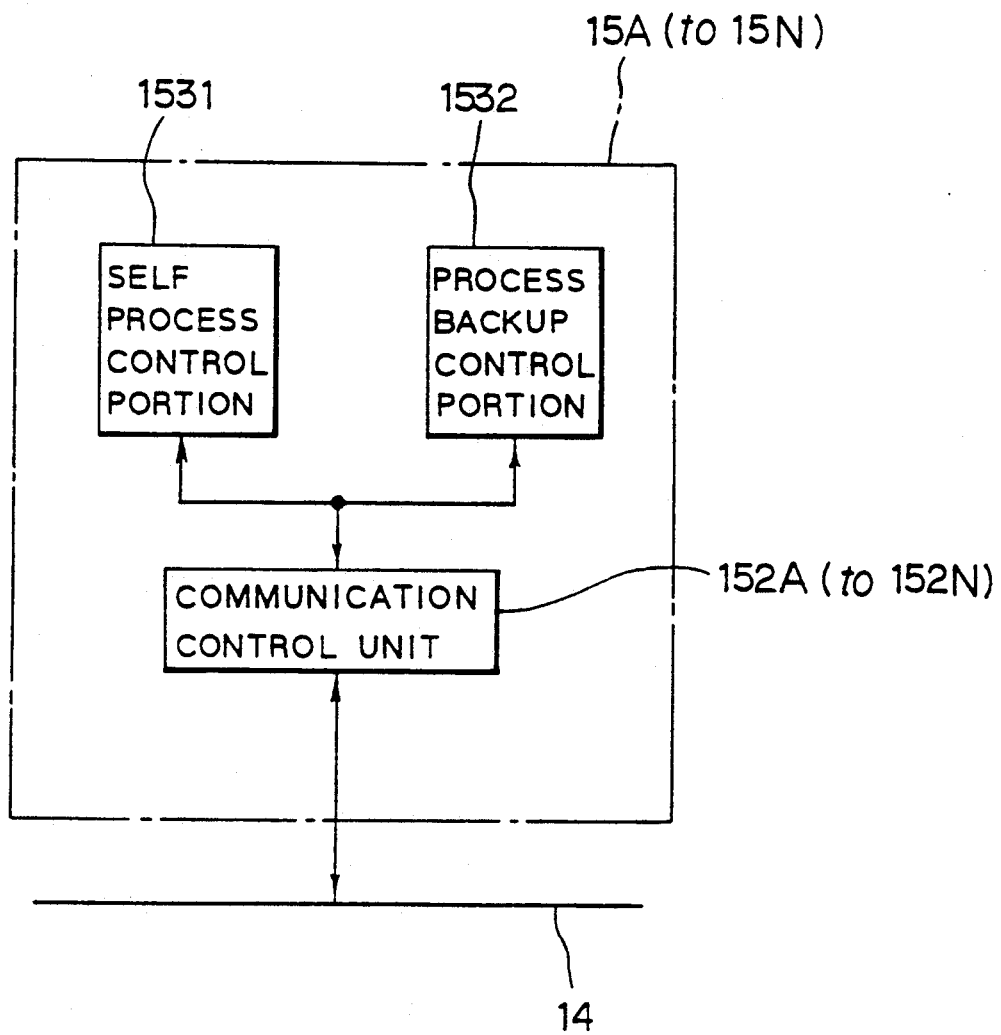
FIG. 3D shows a functional schematic block diagram for a data memory and an arithmetic and control unit in a process controller.

According to the aforementioned operation, a part of the data memory 151A (to 151N) and the arithmetic and control unit 153A (to 153N) can be expressed functionally as in FIG. 3D. That is, the part includes a self process control portion 1531 corresponding to the operation in FIG. 3A, and a process backup control portion 1532 corresponding to the operation in FIG. 3B and 3C.

On the other hand, each of the operator consoles 16A to 16N, as shown in FIG. 1, comprises an input unit 161A (to 161N) and a display unit 163A (to 163N), and a console controller 162A (to 162N) which is electrically connected to the input units 161A (to 161N), the display units 163A (to 163N), and the transmission line 14. Each input unit 161A (to 161N) is composed of a key board, for instance, and necessary commands can be supplied to this plant monitoring and control system 10 by an operator with the input unit 161A (to 161N). Each display unit 163A (to 163N) is composed of a CRT (cathode ray lube), for instance, and is able to display images according to the display signals given by the console controller 162A (to 162N). In this embodiment, the two sets of an input unit 161A (to 161N) and a display unit 163A (to 163N) are connected in parallel to the single console controller 162A (to 162N), thus providing continues display even when either one of the two display units 163A, 163A (to 163N, 163N) might be broken down.

The console controller 162A (to 162N) is composed of a data memory (not shown), an arithmetic and control unit (not shown), and a communication control unit (refer to FIG. 4), respectively. Each data memory stores therein both a backup order table and a display operation procedure table in the form of look-up tables. Both the backup order table and display operation procedure table can be referred to, as the same theory as the process controller 15A (to 15N), when some of the console controllers 162A to 162N have failed. The arithmetic and control unit includes a CPU and can perform the operation of display procedure, correspondingly one to one to the control systems, for display of process variables. The arithmetic and control unit is designed to display process data in color, pattern, and numerical value on the screen of the paired display units 163A, 163A ... 163N, 163N.

Figure 4:
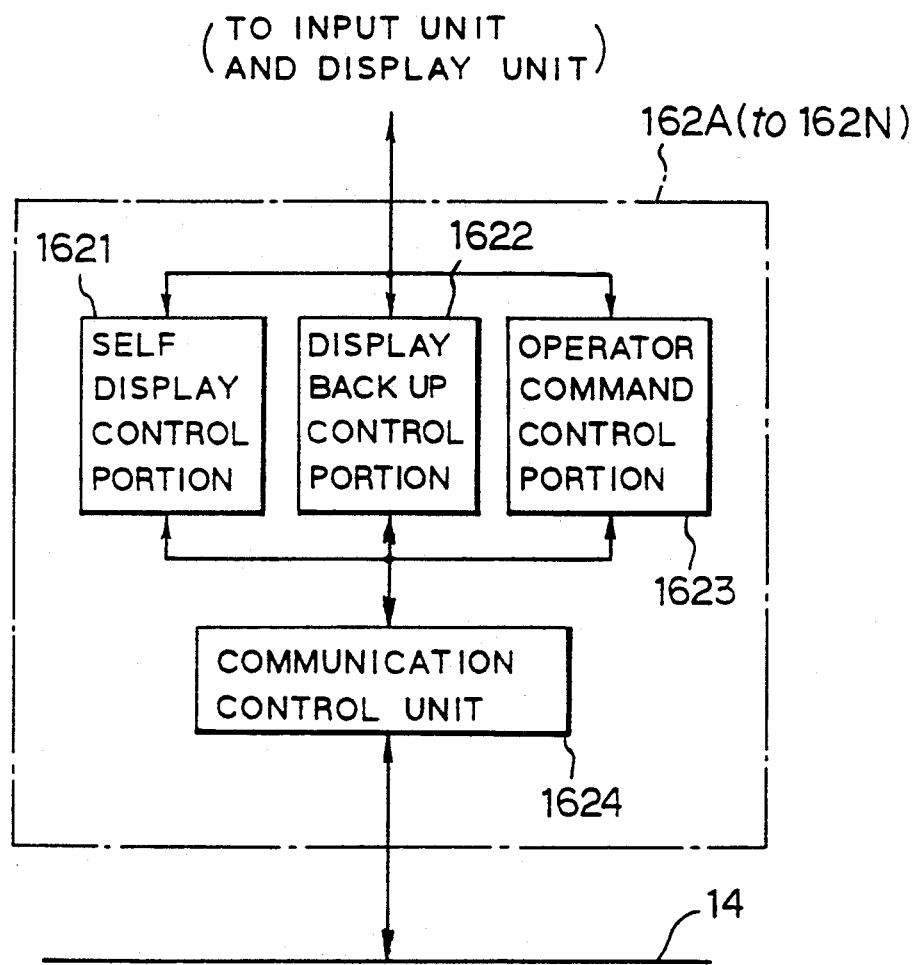
FIG. 4 shows a functional schematic block diagram for a console controller.

Therefore, each of the console controllers 162A to 162N can functionally be expressed in FIG. 4. That is, there are provided a self display control portion 1621, a display backup control portion 1622, a operator command control portion 1623, and a communication control unit 1624. The self display control portion 1621 and the display backup control portion 1622 are functionally formed by the data memory and the arithmetic and control unit incorporated therein. The operator command control portion 1623 is functionally formed by the arithmetic and control unit, and interprets commands from an operator via the input unit 161A (to 161N) and transmits interpreted signals to the portions 1621 and 1622 and the unit 1624.

Further, the communication control unit 1624 is provided with a CPU, and in charge of data exchanges based on the broadcast communication described above.

In this embodiment, the remote process input-output units 13A to 13N act as means for supplying detection signals and also driving the process devices 12A to 12N. The operator command control portion 1623 and the communication control unit 1624 in the console controllers 162A to 162N compose means for supplying command signals. The combination of the self process control portion 1531 and the communication control unit 152A (to 152N) forms means for controlling the process. In the same way, the combination of the process backup control portion 1532 and the communication control unit 152A (to 152N) forms each control backup means. Further, the self display control portion 1621 and the communication control unit 1624 in the console controller 162A (to 162N) can be combined in forming means for controlling displays. Still further, the display backup control portion 1622 and the communication control unit 1624 in the console controller 162A (to 162N) can be combined in forming display backup means.

Next, the overall operation of this embodiment will now be explained.

Based on the broadcast communication, upon receipt of command signals of operators provided to input units 161A to 161N and process variable detection signals from the detectors 11A to 11N, the process controllers 15A to 15N compute control signals according to an arithmetic operation procedure for themselves. Then, the control signals are each provided to the process devices 12A to 12N via the remote process input-output units 13A to 13N using the broadcast communication technique. A series of these processes permits the process devices 12A to 12N to operate so as to meet their desired status.

Under the above normal state, if any one process controller 15A (to 15N) gets faulty, the process controller 15A (to 15N) generates a failure signal showing abandonment of its control. The failure signal is outputted into the transmission line 14 via a communication control unit 152A (to 152N) with the broadcast communication. The failure signal through the transmission line 14 is then taken in by the other process controllers 15A to 15N via the other communication control units 152A to 152N for recognition of the backup order, respectively. Then, if the received failure signal is recognized as the signal which corresponds to the first order, the process controller 15A (to 15N) recognizing the first backup order carries out the processing assigned to the failed process controller 15A (to 15N) as a substitute as well as its own processing originally assigned.

Further, under operation against failure of the first backup order, when another failure signal is outputted, one of the remaining non-failed process controllers 15A to 15N will operate as a substitute, namely, in the case, the process controller 15A (to 15N) in charge of a substitute can perform the procedures about the first and second backup orders in addition to its own procedure.

For example, in the case of FIG. 2, if the process controller 15A gets faulty, then the arithmetic and control unit 153B of the process controller 15B standing first in the backup order receives the failure signal, reads arithmetic operation procedure A from the memory 151B. Then the unit 153B carries out the procedure concurrently with its own arithmetic operation procedure B, thereby backing up the process controller 15A. Moreover, in this case, if the process controller 15C gets faulty, the arithmetic and control unit 153B of the process controller 15B also backs up the process controller 15C using the time shared operation.

On the other hand, when at least one of the console controllers 162A to 162N gets faulty, other console controllers 162A to 162N back up in accordance with the backup order, in the same way as above-mentioned. A display procedure of the faulty console controller 162A, for example, is carried out by the console controller 162B.

As described above, multiplexing both the process controller and the console controller can be omitted by incorporating the mutual backup mechanism therein. Therefore, the redundant system is simplified with a high reliability.

Also, when a scale of the aforementioned display is small, the display procedures corresponding to all the process systems A to N will be stored by one console controller 162A, thereby backing up the other process systems.

Further, the backup order of the process and display control in the present invention is not limited to the two orders, i.e., first and second backups, and other orders are also applicable. For example, one order having only the first backup or three orders having the first to third backups is applicable in the same way as described above.

A second embodiment of the present invention will now be described with reference to FIG. 5. The second embodiment is arranged in such a manner that the plant monitoring and control system 10 constructed as above is applied to a BWR (boiling water reactor) power plant, as a more practical use.

Figure 5:
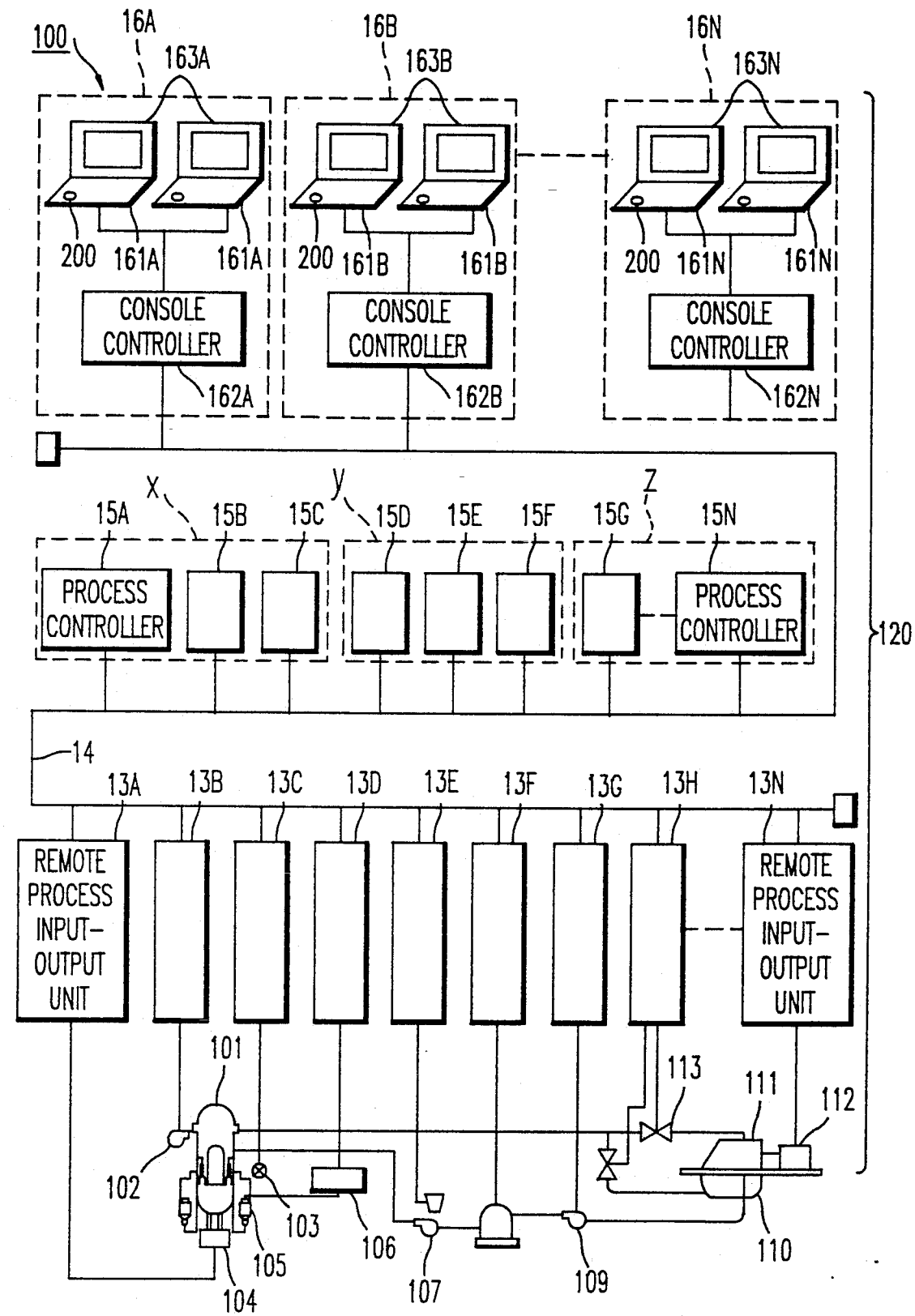
FIG. 5 is a schematic block diagram of a plant monitoring and control system according to a second preferred embodiment of the present invention.

A BWR atomic power plant 100 shown in FIG. 5 operates for generation of electric power on a generator 112 by leading a steam produced in a reactor 101 to a steam turbine 111, and rotating the steam turbine 111.

Rotations of the steam turbine 111 are controlled by a steam regulating valve 113 and a by-pass valve 114 on a turbine inlet.

The steam used for rotating the steam turbine 111 is condensed by a condenser 110, and is returned to the reactor 101 again by a feed-water pump 107 by way of a condensate pump 109 and a feed-Water heater 108.

An output of the reactor 101 is controlled by operating a control rod inserted from a lower portion of the reactor 101 into the reactor 101 by means of a control rod driving mechanism 104, or otherwise by extracting a part of water in the reactor 101 by means of a reactor recirculating pump 105 to adjust the recirculation amount.

The recirculation amount is then controlled by controlling a rotational frequency of the reactor recirculating pump 105, and thus an inverter 106 has been employed recently.

Then, an emergency core cooling pump 102 for cooling down a core in the reactor 101 is provided for the unlikely event of abnormality, and a multiplicity of sensors 103 are installed for monitoring and control of the complicated plant process.

The above-mentioned BWR atomic power plant 100 is provided with the plant monitoring and control system 120 which is constructed in the same way as in the first embodiment.

According to FIG. 5, the same elements as those according to the first embodiment are given the same reference numerals and their descriptions are omitted or simplified here.

That is, the remote process input-output units 13A to 13N are connected to the aforementioned process devices and the detectors. As a result, necessary process variable detection signals are inputted into the units 13A to 13N each, and also control signals are outputted from the units 13A to 13N to the process devices each.

The detection signals inputted to the remote process input-output units 13A to 13N are taken in the process controllers 15A to 15N by way of the transmission line 14, and thus a necessary arithmetic operation is carried out therein. The process controllers 15A to 15N are separated each into three groups, for example, coming in a safety system corresponding controller system x, a continuous controller system y, and a sequence controller system z from differences in attribute of the arithmetic operation.

Then, each of the process controllers 15A to 15N is provided with a backup mechanism which backs up mutually among the controllers in the same group. The backup mechanism itself has the same composition as described in the first embodiment.

For example, a function as reactor recirculating flow controller is assigned normally to one process controller 15D in the continuous controller system y. However, should a function as, for example, feed-water flow controller which is carried out by the other process controller 15E in the same system y be lost, the function as feed-water flow controller will be carried out together on the process controller 15D by the backup mechanism.

Thus, a high reliability of the process controllers 15A to 15N is secured without multiplexing these process controllers themselves. That is, the whole control system can be simplified. Moreover, a fall in plant availability due to a failure of the controllers 15A to 15N may be prevented.

On the other hand, the operator consoles 16A to 16N are classified each into a safety system operator console group, a reactor system operator console group, a turbine generator system operator console group, and other auxiliary equipment system operator console group, and carry out a display operation assigned as function distribution each normally. Moreover, the operator consoles 16A to 16N are of a configuration and store all display operation procedures, and the arithmetic operation other than display operation functions assigned normally is executable from every operator consoles 16A to 16N.

In this embodiment, each of the input units 161A to 161N is provided with a keyed switch 200, and the console controllers 162A to 162N are designed each to read ON-OFF information from the keyed switch 200 and switch the display operation functions. That is, when the keyed switch 200 is in the OFF position by an operator, the console controller 162A (to 162N) is unable to perform its backup control, thus being able to perform only normal operations. Therefore, it is possible to assign the console controllers 162A to 162N backup controllers, for example, in accordance with a degree of calculation load.

Accordingly if one console controller 162A, for example, gets faulty, the display operation assigned to the faulty console controller 162A can easily be carried out successively to backup by other console controllers 162B (to 162N), in which the keyed switch 200 is at the ON position. Therefore, a reliability for the display can be enhanced without multiplexing the console controllers 162A to 162N.

Then, in the above embodiment, inputting passwords from the input units 161A to 161N may be substituted for the keyed switch 200. In that case, the passwords should be decided corresponding to the ON-OFF states of the keyed switch 200.

In regard to a grouping of the process controllers 15A to 15N or the operator consoles 16A to 16N, the invention is not necessarily limited to the second embodiment, and hence these can properly be grouped in consideration of a procedure of the process controllers 15A to 15N or the console controllers 162A to 162N.

Further, with reference to a backup order of the process controllers 15A to 15N, it can be coordinated by updating a backup sequence at a predetermined period in the order of light load according to a processing condition of tasks of the process controllers 15A to 15N.

Figure 6:
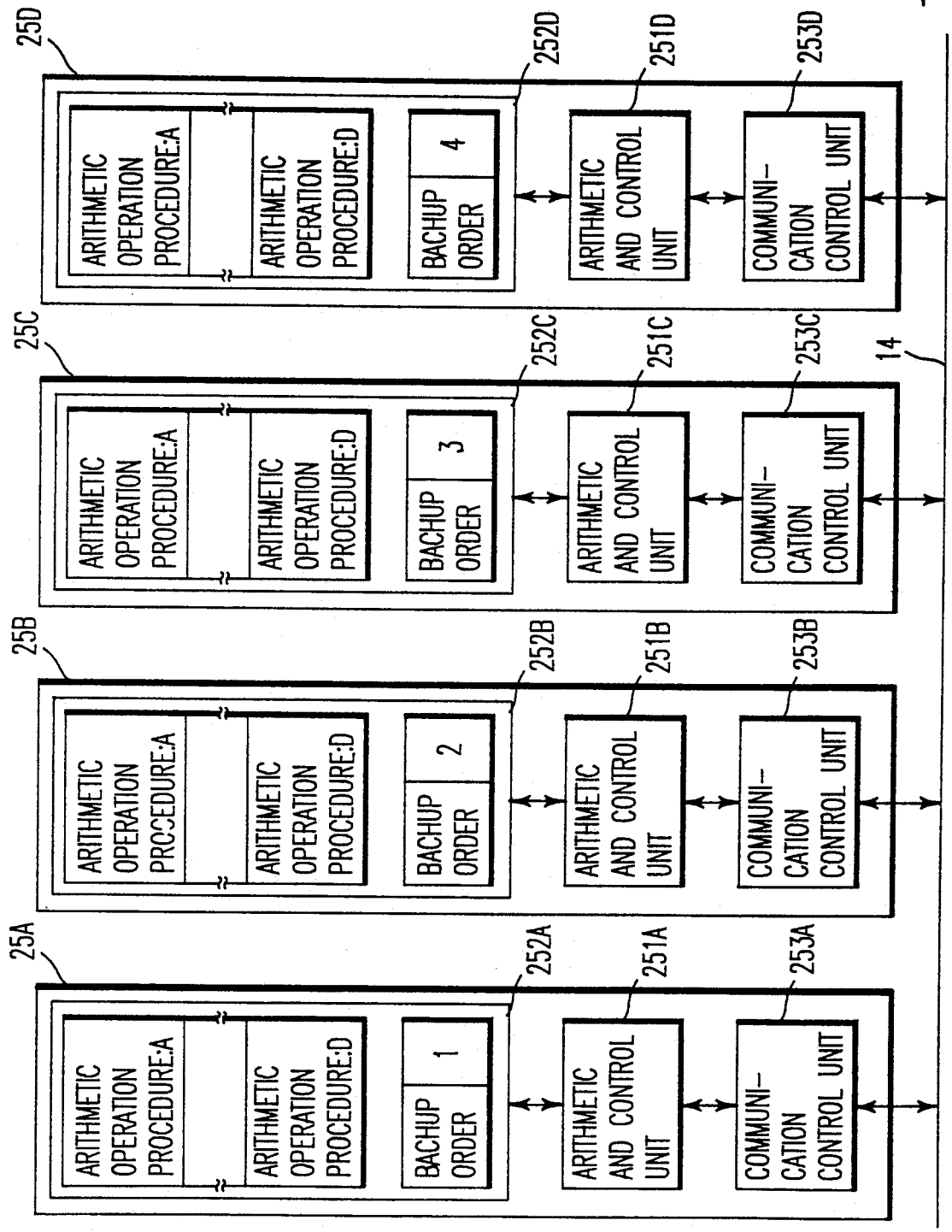
FIG. 6 is a schematic block diagram of process controllers according to a modified embodiment for the present invention.

As shown in FIG. 6, for example, when there are present four process controllers 25A, 25B, 25C, 25D including the process control means and the control backup means respectively, a processing condition of tasks at the current point in time is subjected to information interchange at a predetermined period by way of the transmission line 14.

Now, assuming that the order of light load comes in the process controllers 25A, 25B, 25C, 25D, arithmetic and control units 251A, 251B, 251C, 251D of the process controllers 25A to 25D write a backup order in backup areas in memories 252A, 252B, 252C, 252D respectively, and thus, for example, a backup order 1 is written in the memory 252A of the process controller 25A. In this case, a backup order 2 is written in the memory 252B, an order 3 in the memory 253C, and an order 4 in the memory 253D. In FIG. 6, reference characters 253A to 253D represent communication controllers.

In such state, if any of the process controllers 25B to 25D gets faulty, then the process controller 25A carries out control and arithmetic operation of any of the faulty process controllers 25B to 25D according to the backup order with self control and operation.

Then, the task processing condition should be changed from the previous state, and a modification process of the backup order is carried out at a predetermined period among the remaining normal process controllers, for example, 25A, 25C and 25D.

Consequently, one of the process controllers 25A to 25D which is the lightest in load, that is, the largest in tolerance, can be driven as a backup unit at all times.

Further, it is possible for the present invention to adopt only either one of the control backup means or the display backup means in the aforementioned embodiments.

Still further, it is possible for the present invention to adopt a construction in which the process controllers and operator consoles are not provided correspondingly one to one to each of the process systems.

What we claim is:

1. A plant monitoring and control system comprising:
    a plurality of detectors for outputting detection signals corresponding to respective process variables of plural process systems to which individual control functions are assigned in a plant;
    a plurality of process devices for controlling the respective process systems in response to control signals;
    a transmission line for transmitting signals by broadcast communication;
    a plurality of means for supplying said detection signals detected by said detectors into the transmission line according to said broadcast communication;
    a plurality of input units, usable by operators, provided correspondingly to the respective process systems for generating command signals;
    a plurality of means for supplying said command signals generated by the respective input units into the transmission line according to said broadcast communication;
    a plurality of process controllers each having a control means for controlling the process systems by receiving the detection signals and command signals from the transmission line according to said broadcast communication, calculating the control signals in accordance with assigned control functions for the process systems, and supplying the control signals into the transmission line according to said broadcast communication;
    a plurality of means for driving the process devices by receiving the control signals from the transmission line according to said broadcast communication and supplying the control signals to the respective process devices,
    wherein at least one of said plurality of process controllers comprises a control backup means for backing up at least one of the remaining process controllers which failed in operation.

2. A system as claimed in claim 1, wherein said control means and said control backup means operate using time sharing in the process controller.

3. A system as claimed in claim 1, wherein said plant is a reactor power plant.

4. A system as claimed in claim 1, wherein said plurality of process controllers are divided into a plurality of groups according to attributes of the assigned control functions to the process systems and said control means in the same group only.

5. A system as claimed in claim 1, wherein each of said plurality of process controllers includes said control backup means.

6. A system as claimed in claim 5, wherein each of said plurality of process controllers has means for determining a self failure in operation and means for outputting a failure signal into the transmission line according to the broadcast communication if said self failure is determined by the determining means.

7. A system as claimed in claim 6, wherein said control backup means has a means for detecting the failure signal transmitted through the transmission line according to the broadcast communication and a means for backing up the failed process controller when the failure signal is detected by the detecting means.

8. A system as claimed in claim 7, wherein said backup mechanism is provided with a backup order table having a backup order for the control means of the other process controllers, an arithmetic operation procedure table having an operation procedure in accordance with the control functions assigned to the process systems to be backed up, and a unit for calculating the control signals on the basis of data read from the backup order table and the arithmetic operation procedure table.

9. A system as claimed in claim 8, wherein each of said plurality of process controllers further comprises means for interchanging with each other information representing task amounts of the self control means through the transmission line and means for updating the backup order in the self backup order table at a predetermined period in an order of light tasks on the basis of the interchanged information.

10. A system as claimed in claim 8, wherein said backup order consists of a plurality of backed-up numbers representing the other process controllers.

11. A system as claimed in claim 10, wherein said plurality of backed-up numbers are allocated according to priority sequences, respectively.

12. A system as claimed in claim 11, wherein each of said priority sequences in the plurality of process controllers has a different top-ranked backed-up number.

13. A system as claimed in claim 12, wherein each of said backup means for said process controllers further comprises a unit for judging the backup order in compliance with the priority sequence assigned to the self process controllers and a unit for avoiding interference with the backup control among the backup means of the remaining process controllers.

14. A plant monitoring and control system comprising:
- a plurality of detectors for outputting detection signals corresponding to respective process variables of plural process systems to which individual control functions are assigned in a plant;
- a plurality of process devices for controlling the respective process systems in response to control signals;
- a transmission line for transmitting signals by broadcast communication;
- a plurality of means for supplying the detection signals detected by the detectors into the transmission line according to said broadcast communication;
- a plurality of input units, usable by operators, provided correspondingly to the respective process systems for generating command signals;
- a plurality of means for supplying the command signals generated by the respective input units into the transmission line according to said broadcast communication;
- a plurality of process controllers each having a control means for controlling the process systems by receiving the detection signals and command signals from the transmission line according to said broadcast communication, calculating the control signals in accordance with the assigned control functions for the process systems, and supplying the control signals into the transmission line according to said broadcast communication;
- a plurality of means for driving the process devices by receiving the control signals from the transmission line according to said broadcast communication and supplying the control signals to the process devices;
- a plurality of console controllers, each having a display control means receiving at least one of the detection signals, the control signals and the command signals from the transmission line according to said broadcast communication and forming display signals in accordance with assigned self display functions to the process systems; and
- a plurality of display units each for displaying images in response to the display signals from the console controllers;
- wherein at least one said plurality of console controllers comprises a display backup means for backing up at least one of the remaining console controllers which failed in display.

15. A system as claimed in claim 14, wherein each of said plurality of console controllers includes said display backup means.

16. A system as claimed in claim 15, wherein each of said plurality of input units consists of two input devices connected in parallel.

17. A system as claimed in claim 15, wherein each of said plurality of display units consists of two display devices connected in parallel.

18. A plant monitoring and control system comprising:
- a plurality of detectors for outputting detection signals corresponding to respective process variables of plural process systems to which individual control functions are assigned in a plant;
- a plurality of process devices for controlling the respective process systems in response to control signals;
- a transmission line for controlling the respective process systems in response to control signals;
- a transmission lien for transmitting signals by broadcast communication;
- a plurality of means for supplying the detection signals detected by the detectors into the transmission line according to said broadcast communication;
- a plurality of input units, usable by operators, provided correspondingly to the respective process systems for generating command signals;
- a plurality of means for supplying said command signals generated by the respective input units into the transmission line according to said broadcast communication;
- a plurality of process controllers each having a control means for controlling the process systems by receiving the detection signals and command signals from the transmission line according to said broadcast communication, calculating the control signals in accordance with the assigned control functions for the process systems, and supplying the control signals into the transmission line according to the broadcast communication;
- a plurality of means for driving the process devices by receiving the control signals from the transmission line according to said broadcast communication and supplying the control signals to the respective process devices;
- a plurality of console controllers each having a display control means for receiving at least one of the detection signals, the control signals and the command signals from the transmission line according to said broadcast communication and forming display signals in accordance with assigned self display functions to the process systems; and a plurality of display units each for displaying images in response to the display signals from the console controllers;

wherein at least one of said plurality of process controllers comprises a control backup means for backing up at least one of the remaining process controllers which failed in operation and at least one of said plurality of console controllers comprises a display backup means for backing up at least one of the remaining console controllers which failed in display.

19. A system as claimed in claim 18, wherein said control means and said control backup means operate using time sharing in the process controller.

20. A system as claimed in claim 18, wherein each of said plurality of console controllers includes a display backup means.

21. A system as claimed in claim 18, wherein the console controller, the input unit, and the display unit are incorporated in the same operator console, said operator console being installed correspondingly to each of the plurality of process systems.

22. A system as claimed in claim 18 wherein said plant is a reactor power plant.

23. A system as claimed in claim 22, wherein said plurality of console controllers are divided into a plurality of groups according to attributes of the assigned display functions to process systems and said backup means backs up the display control means in the same group only.

24. A system as claimed in claim 18, wherein each of said plurality of console controllers includes said display backup means.

25. A system as claimed in claim 24, wherein each of said plurality of input units is provided with a keyed switch having operator-changed ON and OFF positions for outputting switching signals corresponding to the ON and OFF positions and outputting switching signals corresponding to the ON and OFF positions and each of said plurality of console controllers incorporates a mechanism for bringing the display backup means into a working condition only when the switching signal corresponding to the ON position is output by the keyed switch.

26. A system as claimed in claim 24, wherein each of said plurality of input units is provided with a means for receiving a password from the operator and a means for comparing the received password with a predetermined password and outputting signals corresponding to coincidence and noncoincidence between the passwords and each of said plurality of console controllers incorporates a means for bringing the display backup means into a working condition only when the signal corresponding to the coincidence is output by the comparing and outputting means.

27. A system as claimed in claim 18, wherein each of said plurality of input units consists of two input devices connected in parallel.

28. A system as claimed in claim 18, wherein each of said plurality of display units consists of two display devices connected in parallel.

29. A system as claimed in claim 18, wherein each of said plurality of process controllers are divided into a plurality of groups according to attributes of the assigned control 30. A system as claimed in claim 18, wherein each of said plurality of process controllers includes said control backup means.

31. A system as claimed in claim 30, wherein each of said plurality of process controllers includes means for determining self failure in operation and means for outputting a failure signal into the transmission line according to the broadcast communication if the self failure is determined by the determining means.

32. A system as claimed in claim 31, wherein said control backup means includes a means for detecting the failure signal transmitted through the transmission line according to the broadcast communication and a mechanism for backup up the failed process controller when the failure signal is detected by detecting means.

33. A system as claimed in claim 32, wherein said backup means is provided with a backup order table having a backup order for the control means of the other process controllers, an arithmetic operation procedure table having an operation procedure in accordance with the control functions which are assigned to the process systems to be backed up, and a unit for calculating the control signals on the basis of data read from the backup order table and the arithmetic operation procedure table.

34. A system as claimed in claim 33, wherein each of said plurality of process controllers further comprises means for interchanging with each other information representing tasks amounts of the self control means through the transmission line and means for updating the backup order in the self backup order table at a predetermined period in an order of light tasks on the basis of the interchanged information.

35. A system as claimed in claim 33, wherein said backup order consists of a plurality of backed-up numbers representing the other process controllers.

36. A system as claimed in claim 35, wherein said plurality of backed-up numbers are allocated according to a priority sequence.

37. A system as claimed in claim 36, wherein each of said priority sequences in the plurality of process controllers has a different top-ranked backed-up number.

38. A system as claimed in claim 37, wherein each of said backup mechanisms of said process controllers further comprises a unit for determining the backup order in compliance with the priority sequence assigned to the self process controllers and a unit for avoiding interference with the backup control among the backup means for the remaining process controllers.

* * * * *